United States Patent [19]

Waldrop

[11] Patent Number: 4,943,404
[45] Date of Patent: Jul. 24, 1990

[54] PROCESS FOR PRODUCING A FIBER REINFORCED THERMOPLASTIC ARTICLE

[75] Inventor: Joe R. Waldrop, Bartlesville, Okla.

[73] Assignee: Phillips Petroleum Company, Bartlesville, Okla.

[21] Appl. No.: 238,328

[22] Filed: Aug. 30, 1988

Related U.S. Application Data

[62] Division of Ser. No. 120,293, Nov. 13, 1987, abandoned.

[51] Int. Cl.$^5$ .................. B29C 43/18; B29C 43/20
[52] U.S. Cl. ..................... 264/257; 264/258; 264/278; 264/279
[58] Field of Search ............. 264/257, 258, 255, 278, 264/250, 275, 276, 277, 279, 279.1

[56] References Cited

U.S. PATENT DOCUMENTS

| | | | |
|---|---|---|---|
| 3,218,383 | 11/1965 | White | 264/279 |
| 4,040,670 | 8/1977 | Williams | 264/279.1 |
| 4,115,505 | 9/1978 | Metabi | 264/275 |
| 4,164,675 | 8/1979 | Sato | 264/277 |
| 4,264,222 | 4/1981 | Bauer | 264/275 |
| 4,312,917 | 1/1982 | Hawley | 264/255 |
| 4,357,293 | 11/1982 | Williamson | 264/275 |
| 4,405,398 | 9/1983 | Rother | 264/275 |
| 4,430,285 | 2/1984 | Runyan | 264/279 |
| 4,451,528 | 5/1984 | Krause | 428/287 |
| 4,530,147 | 7/1985 | Mattei | 156/297 |
| 4,603,071 | 7/1986 | Wehnert | 428/112 |
| 4,645,565 | 2/1987 | Vallee | 162/123 |
| 4,695,602 | 9/1987 | Crosby | 524/439 |
| 4,718,837 | 1/1988 | Frazzell | 264/257 |
| 4,786,347 | 11/1988 | Angus | 264/258 |
| 4,826,645 | 5/1989 | Angus | 264/257 |

OTHER PUBLICATIONS

Chem. Eng. Prog. 6/86-Asphahani et al., "Overview of Advanced Material Technology".
Plastic Tech. 6/86-Krone et al., "Processing Thermoplastic Advanced Composites".
SAMPE Meeting 10/86-Murtha et al., "Properties and Processing of Ryton PPS Composite".
Perry's Chemical Engineer's Handbook, 6th Ed. (Copyright 1984) pp. 661-662.

*Primary Examiner*—Jay H. Woo
*Assistant Examiner*—Jeremiah F. Durkin
*Attorney, Agent, or Firm*—Richmond, Phillips, Hitchcock & Umphlett

[57] ABSTRACT

A process for molding a thermoplastic fiber reinforced article including the step of positioning a first thermoplastic tubular member on a first mandrel and a second thermoplastic tubular member on a second mandrel. Each tubular member is reinforced with oriented filaments. The first and second mandrels having the respective first and second tubular members thereon are positioned in a mold cavity and the remainder of the cavity is filled with a fiber reinforced thermoplastic matrix. The fiber reinforced matrix may be compression molded or injection molded.

12 Claims, 2 Drawing Sheets

PROCESS FOR PRODUCING A FIBER REINFORCED THERMOPLASTIC ARTICLE

This application is a divisional of copending application Ser. No. 120,293 filed Nov. 13, 1987, now U.S. Pat. No. 4,786,031.

BACKGROUND OF THE INVENTION

In one aspect, the invention relates to a process for selectively positioning fiber reinforcement in a composite article. In another aspect, this invention relates to a valve element formed from a composite material and having selectively positioned fiber reinforcement.

Thermopress molding is an extremely desirable technique to use to form articles from thermoplastic composite materials since it allows the use of long fiber reinforcement. Long fiber reinforcement in composite articles generally provides highest performance properties. However, when the long fiber reinforcement is highly oriented, such as in the form of a woven mat, poor fiber flow during the molding operation leaves fiber deficient areas which are prone to premature failure.

Better fiber distributions results when random fiber mat is the reinforcement in a thermoplastic matrix. Random fibers enjoy higher mobility than highly oriented fibers and become well distributed throughout the molded articles. However, molded articles reinforced with random fibers are prone to failure at high stress points because random fibers do no impart the highest performance properties. A technique for selectively providing the high stress points of articles containing random fiber reinforcement with oriented fibers and/or a different loading of reinforcing fibers would be very desirable.

OBJECTS OF THE INVENTION

It is a first object of this invention to provide an article in which effective fiber reinforcement is selectively provided in a localized area.

It is another object of this invention to provide a process for selectively positioning effective fiber reinforcement in a localized area in a composite article.

STATEMENT OF THE INVENTION

In one embodiment of the invention, there is provided a valve element having selectively positioned oriented fiber reinforcement. The valve element is formed from a thermoplastic matrix which contains fiber reinforcement and has a disc like outer shape with an outer circumference which is usually generally circularly or cylindrically shaped. A pair of opposed bores extend generally diametrically inwardly toward the center of the disc from the outer circumference. At least one of these separate opposed bores according to the invention is defined by an insert containing oriented fiber which is encapsulated by the thermoplastic matrix forming the remainder of the valve element so as to be an integral part of the valve element. The insert is preferably characterized as a wound tube of fiber reinforcement in a thermoplastic matrix. When this tube is positioned at the drive end of a butterfly valve operating at elevated pressure, reliability of the valve from functional failures is greatly increased.

In another embodiment of the invention, there is provided a process for providing a filament reinforced insert in a thermoplastic article. A thermoplastic tubular member which is reinforced with oriented long fibers or filaments is positioned on a mandrel. The mandrel having the tubular member mounted thereon is positioned in a portion of a mold cavity. The remainder of the mold cavity is then filled with fiber reinforced thermoplastic matrix, such as in the form of prepreg blanks or injection molding compound. An article having the shape of the mold cavity with the tubular member encapsulated therein is formed. After a short cooling period, the article is removed from the mold cavity; and the mandrel, either before or afterwards, is removed from the article, thus defining a borehole in the article which is reinforced with oriented filaments. High fiber loading and great strength can be provided by filament winding the insert. The process is generally applicable to thermoplastic composite articles having a borehole positioned therein and is especially well adapted to provide a valve element as hereinabove discussed.

DETAILED DESCRIPTION OF THE INVENTION

Figure 1:
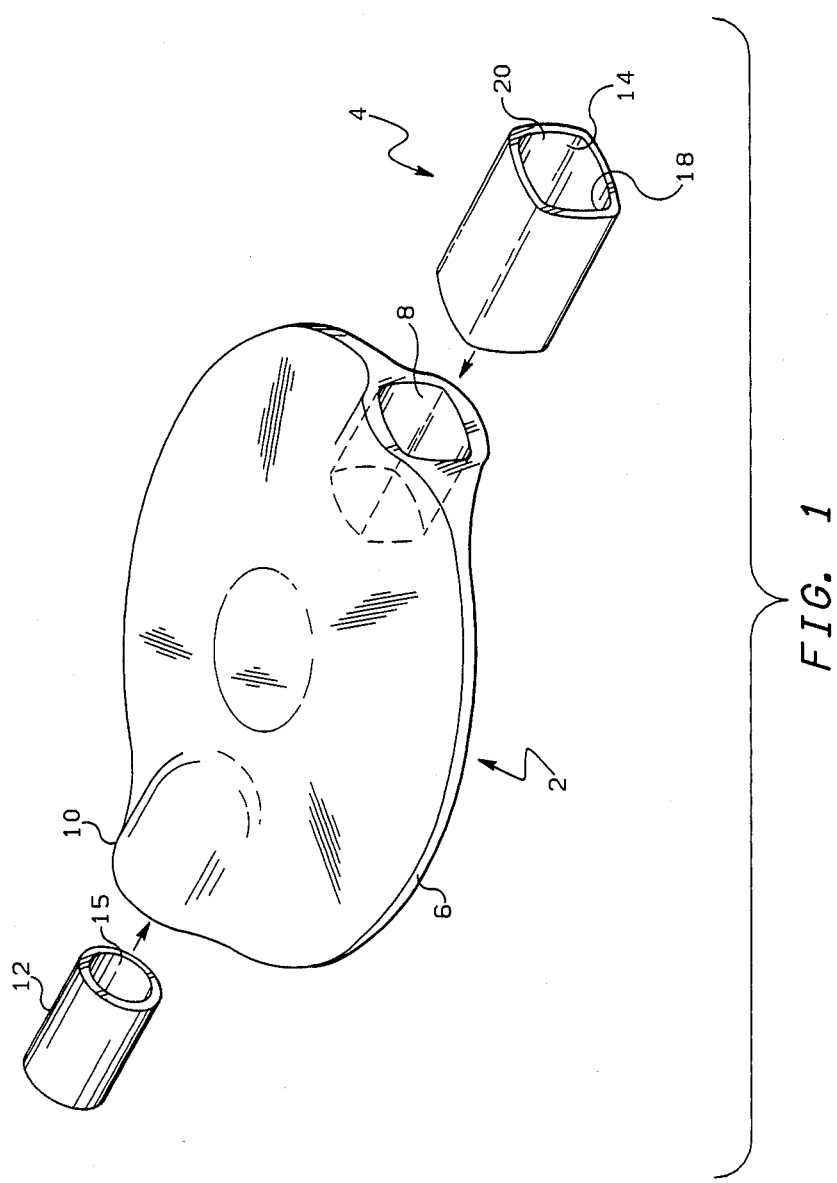
FIG. 1 is a pictorial representation illustrating in exploded view a valve element incorporating certain features of the present invention.

In accordance with certain features of an embodiment of the present invention, there is provided a valve element called out generally by the reference numeral 2 which is formed from a thermoplastic matrix containing fiber reinforcement and has encapsulated therein at least one tube or insert 4 of fiber reinforcement, preferably wound reinforcement, in a thermoplastic matrix so as to provide localized reinforcement to a high stress area of the valve element 2. Generally speaking, the valve element 2 will have a disc like outer shape and an outer circumference 6 which is generally circular or cylindrical in shape. A pair of opposed bores 8 and 10, preferably separate, extend diametrically inwardly toward the center of the disc from the outer circumference 6. At least one of said opposed bores 8 or 10 is defined by the insert 4. In the embodiment of the invention shown in FIG. 1, the insert 4 is positioned to define the borehole 8 and an insert 12 is positioned to define the borehole 10.

The thermoplastic matrices utilized to form the valve element and the inserts 4 and 12 are preferably, although not necessarily, of the same thermoplastic polymer. Usually, the matrix of each will be selected from the group consisting of polyethylene, polypropylene, polytetrafluoroethylene, polyamide and poly(arylene sulfide), and copolymers based on such materials, since these materials are commercially available and well suited for composite production. Most preferably, the matrix is formed from a poly(arylene sulfide) polymer (hereinafter PAS) because PAS has excellent corrosion resistance and strength and can be used over a wide temperature range. The preferred PAS comprises a poly(phenylene sulfide), (hereinafter PPS), which term includes homopolymers, copolymers, terpolymers and the like which have a melting or softening temperature of at least about 300° F. Preferred PPS usually has a melting or softening point in the range of from about 500° to about 650° F. Preferably, the PPS has a melting or softening point such that it processes between about 600° F. and about 650° F. For processing purposes, it is preferred that the PPS have a melt flow in the range of from about 1 to about 500 g/10 minutes, preferably in the range of from about 25 to about 250 g/10 minutes. The melt flow of PPS can be regulated by incorporating small amounts of trichlorobenzene comonomer into the polymerization reactor or by "curing" the polymer by air exposure at elevated temperatures.

The fiber reinforcement used in the valve element and the fiber reinforcement used in the insert can be selected from a wide variety of materials. Preferably, the reinforcing fibers are selected from the group consisting of glass, carbon, aramid, metals, and ceramics, although glass or carbon fibers are preferred because they are economical and provide good properties in the final product. Carbon fiber provides the highest performance properties in terms of corrosion resistance and strength.

The insert is preferably fabricated by filament winding a roving of the desired reinforcement which has been impregnated with the desired thermoplastic resin (generally in molten form) onto a mandrel having a desired exterior shape. The roving will generally contain about 40 to about 80 weight percent of fiber, usually 50 to 70 wt.% of continuous fiber. The insert 4 preferably has an inside surface 14 which determines the bore and the inside surface is preferably noncylindrically shaped so as to provide engagement with a shaft (not shown) when inserted thereinto. Where inserts are positioned in each of the opposed bores, the borehole 10 which is opposite from the noncylindrically shaped borehole 8 can be provided with a smooth and cylindrical inside surface 15 by filament winding the insert 12 onto a cylindrical shaft or mandrel. The borehole 14 which is noncylindrically shaped is preferably provided with at least one pair of opposed flats 18 and 20 since a pair of flats will provide adequate engagement for a drive shaft and is easy to fabricate by consolidating filament windings on a suitably shaped mandrel.

Figure 2:
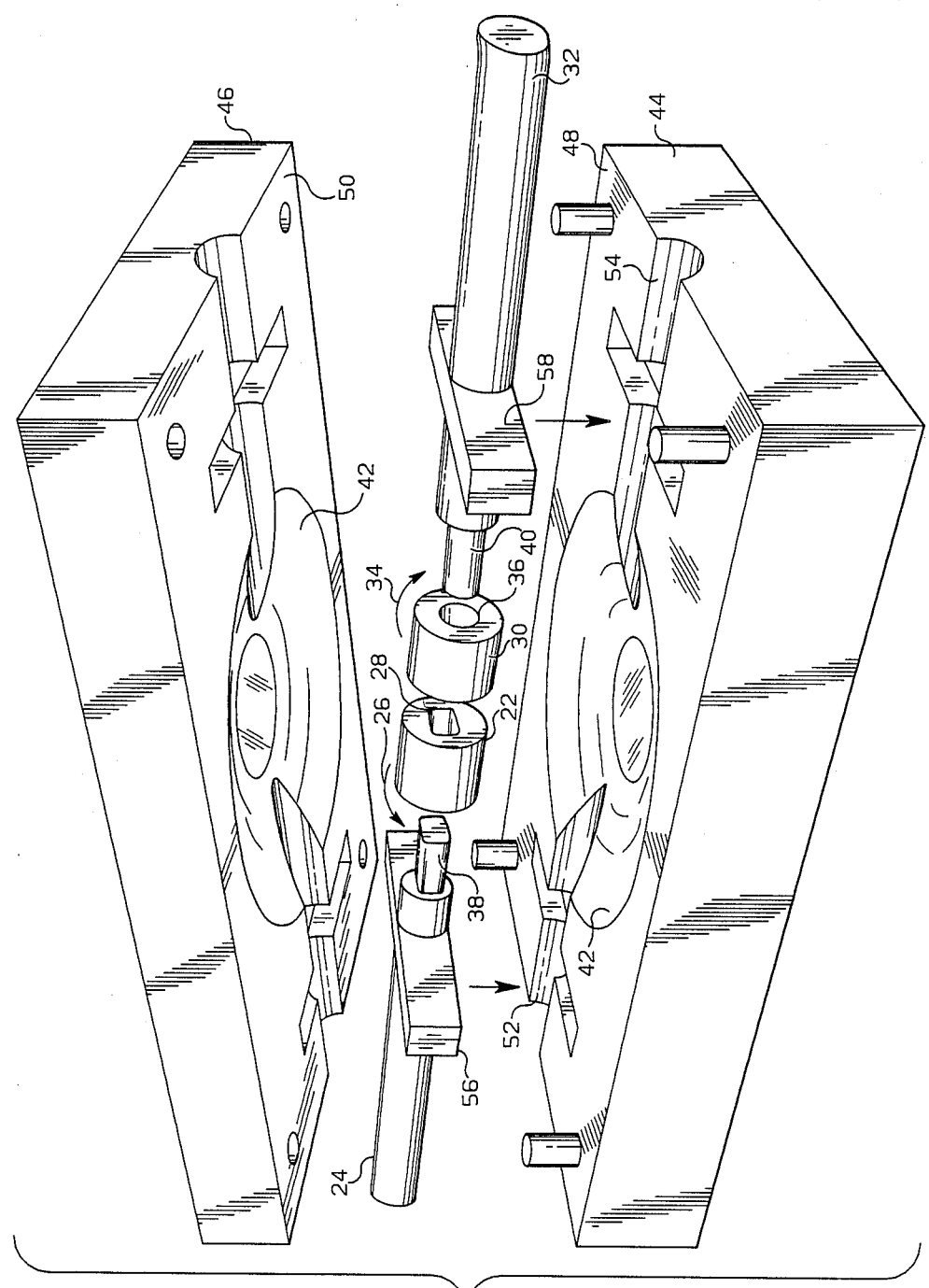
FIG. 2 is a pictorial representation illustrating the process of the present invention.

FIG. 2 illustrates the process of the present invention. In accordance with the embodiment of the invention illustrated in FIG. 2 a plastic tubular member 22 to serve as the insert 4 is positioned on a mandrel 24 as indicated by arrow 26. The tubular member 22 preferably has a borehole 28 therein which is noncylindrically shaped. An optional second tubular member 30 to serve as the opposite insert can be positioned on mandrel 32 as indicated by arrow 34. The tubular member 30 will usually have a cylindrically shaped borehole 36. The mandrels 24 and 32 have end portions 38 and 40 respectively which closely receive the boreholes 28 and 36 of the respective tubular members 22 and 30 so as to maintain the desired shape of the borehole in the final product. All corners on the end portions 38 and 40 are preferably rounded to avoid locations highly prone to failure in the articles produced.

The mandrel end portion 38 having the tubular member 22 mounted thereon is positioned in a portion of a mold cavity 42. The mandrel end portion 40 having the tubular member 30 thereon is positioned in mold cavity 42 so that the tubular member 30 is spaced from tubular member 22. In the embodiment of the invention illustrated in FIG. 2, cavity 42 is determined between a pair of mold blocks 44 and 46 having matching faces 48 and 50 respectively. The block 44 is provided with channels 52 and 54 to receive the mandrels 24 and 32 respectively. The block 46 is provided with similar channels not numbered. Register means 56 and 58 are provided on the mandrels 24 and 32 respectively for engagement with registry receipts in the blocks to position the mandrels 24 and 32 during the molding operation.

The remainder of the mold cavity 42 (not occupied by the shafts 24 and 32 having tubular members 22 and 30 thereon) is filled with fiber reinforced thermoplastic matrix preferably so that the completed article is predominantly reinforced with random fibers. In the embodiment of the invention illustrated in FIG. 2, which is a stamp mold, the preferred technique for this step is as follows. Smooth blank composite sheets cut and weighed for correct size, are loaded onto a conveyor screen which then moves through an infrared oven. After the correct molding temperature has been reached (usually 25°–100° F. above the softening point of the resin, 600°–650° F. for PPS), the blanks, now rough textured, exit the heating system and are quickly transferred to the mold cavity 42. The mold can be heated if desired. In the case of PPS, the mold is preferably at a temperature in the range of 200°–300° F. A first portion of the heated blank charge to the mold is positioned in a lower portion of the mold cavity 42. The mandrels and inserts are positioned. The remaining portion of the heated blank charge to the mold is positioned on the top of the mandrels and inserts. An article in the shape of the mold cavity 42 which has the tubular members 22 and 30 encapsulated therein is then produced. In the embodiment of the invention illustrated in FIG. 2 the article is stamp molded. The invention could be practiced in an injection molding apparatus, not shown, if desired. The molded article in the stamp mold is then held under pressure (2–6,000 psi) by a mechanical or hydraulic press (closing speed of greater than 200 in/min., generally 200–700 in/min) until the article has cooled sufficiently to retain its shape. This generally requires less than about 2 minutes. The article is then removed from the mold cavity 42. The mandrels 24 and 32 are removed from the article thus defining at least one borehole in the article which is reinforced with oriented filaments such as filament windings.

Preferably, the article is molded utilizing a press molding technique. The blank composite sheets are preferably reinforced with random fiber mat to provide for fiber flow to all portions of the article during the molding procedure. The blanks generally comprise in the range of about 40 to about 70 wt.% of fiber. However, the invention can also be practiced to produce an injection molded article in which case the mold cavity will be filled with a thermoplastic matrix which is reinforced with short random fibers. By short is meant fibers having a length of 1 cm or less, usually in the range of from about 0.01 up to about 1 cm. Suitable injection molding compound will generally contain in the range of 10 wt.% to 50 wt.% of reinforcng fiber. Either way, the mold cavity is brought up to sufficient pressure, in the case of stamp molding generally from about 2,000 to about 6,000 psi, to cause the thermoplastic of the tubular member 22 and the thermoplastic material with which the remainder of the mold cavity 42 has been filled to form an integral thermoplastic matrix throughout the article.

The article produced according to the invention can be used as the valve element in a butterfly valve, for example, to control fluid flow.

That which is claimed is:

1. A process comprising
   (a) positioning a first thermoplastic tubular member reinforced with oriented filaments on a first mandrel and also a second thermoplastic tubular member reinforced with oriented filaments on a second mandrel by closely receiving an end portion of each mandrel in a borehole of its corresponding tubular member;

(b) positioning the first and second mandrels having the respective first and second tubular members thereon in a portion of a mold cavity so that the first tubular member is spaced from the second tubular member;

(c) filling the remainder of the mold cavity with fiber reinforced thermoplastic matrix;

(d) molding an article in the shape of the mold cavity having the first and second tubular members encapsulated therein;

(e) removing the article from the mold cavity;

(f) removing the first and second mandrels from the respective boreholes of the first and second tubular members in the article.

2. A process as in claim 1 wherein the article is press molded between a pair of mold parts which define the mold cavity therebetween and wherein the filaments of each of the tubular members are wound filaments.

3. A process as in claim 2 wherein the thermoplastic of each of the tubular members and the thermoplastic matrix with which the remainder of the mold cavity is filled comprises a polymer selected from the group consisting of polyethylene, polypropylene, poly(tetrafluoroethylene), polyamide, and poly(arylene sulfide).

4. A process as in claim 3 wherein the filaments and fiber are selected from the group consisting of glass fibers and carbon fibers.

5. A process as in claim 4 further comprising pressurizing the mold cavity sufficiently to cause the thermoplastic of each of the tubular members and the thermoplastic matrix filling the remainder of the mold cavity to form an integral thermoplastic matrix throughout the article.

6. A process as in claim 5 wherein one of said boreholes is noncylindrical.

7. A process as in claim 5 wherein the thermoplastic matrix with which the remainder of the mold cavity is filled is reinforced with random fiber mat.

8. A process as in claim 1 wherein the thermoplastic matrix with which the remainder of the mold cavity is filled is reinforced with short random fibers.

9. A process as in claim 8 wherein the article is injection molded, and each of the thermoplastic tubular members is encapsulated in the injection molded article.

10. A process as in claim 7 wherein the article comprises a valve element in the form of a disc.

11. A process as in claim 10 wherein the thermoplastic matrix comprises poly(phenylene sulfide) and the filaments and fibers are selected from the group consisting of glass fibers and carbon fibers.

12. A process as in claim 2 wherein said process further comprises positioning a first portion of a fiber reinforced thermoplastic blank in a portion of the mold cavity before step (b), and wherein in step (b) each said mandrel having its corresponding tubular member mounted thereon is positioned on said first portion of the blank, and wherein step (c) comprises positioning the remaining portion of the blank on top of said mandrels and their corresponding tubular members after step (b).

* * * * *

UNITED STATES PATENT AND TRADEMARK OFFICE
CERTIFICATE OF CORRECTION

PATENT NO. : 4,943,404
DATED : July 24, 1990
INVENTOR(S) : Joe R. Waldrop

It is certified that error appears in the above-identified patent and that said Letters Patent is hereby corrected as shown below:

ON THE TITLE PAGE

In item [62], delete "abandoned" and insert ---U.S. Pat. 4,786,031---.

Signed and Sealed this

Fourteenth Day of January, 1992

Attest:

HARRY F. MANBECK, JR.

*Attesting Officer*     *Commissioner of Patents and Trademarks*